United States Patent
Bassett

(10) Patent No.: US 12,290,020 B2
(45) Date of Patent: May 6, 2025

(54) SYSTEM FOR AUTOMATICALLY SETTING THE SET POINT OF A PLANTER AUTOMATIC DOWN PRESSURE CONTROL SYSTEM WITH A SEED FURROW SIDEWALL COMPACTION MEASUREMENT DEVICE

(71) Applicant: Dawn Equipment Company, Sycamore, IL (US)

(72) Inventor: Joseph D. Bassett, Sycamore, IL (US)

(73) Assignee: DEERE & COMPANY, Moline, IL (US)

( * ) Notice: Subject to any disclaimer, the term of this patent is extended or adjusted under 35 U.S.C. 154(b) by 373 days.

(21) Appl. No.: 16/740,691

(22) Filed: Jan. 13, 2020

(65) Prior Publication Data

US 2020/0146208 A1    May 14, 2020

Related U.S. Application Data

(63) Continuation of application No. 15/586,743, filed on May 4, 2017, now Pat. No. 10,548,260.

(51) Int. Cl.
*A01C 7/20*    (2006.01)
*A01B 79/00*    (2006.01)
(Continued)

(52) U.S. Cl.
CPC ............ *A01C 7/205* (2013.01); *A01B 79/005* (2013.01); *A01C 5/068* (2013.01); *A01C 5/064* (2013.01); *A01C 7/06* (2013.01)

(58) Field of Classification Search
CPC ......... A01C 7/205; A01C 5/068; A01C 5/064; A01C 7/06; A01B 79/005
See application file for complete search history.

(56) References Cited

U.S. PATENT DOCUMENTS

| | | |
|---|---|---|
| 114,002 A | 4/1871 | Godfrey |
| 321,906 A | 7/1885 | Mcormick |

(Continued)

FOREIGN PATENT DOCUMENTS

| | | |
|---|---|---|
| BE | 551372 | 10/1956 |
| CA | 530673 | 9/1956 |

(Continued)

OTHER PUBLICATIONS

Acu-Grain "Combine Yield Monitor 99% Accurate? 'You Bet Your Bushels!!'" date estimated as early as Feb. 1993 (2 pages).
(Continued)

*Primary Examiner* — Nga X Nguyen
(74) *Attorney, Agent, or Firm* — ICE MILLER LLP; Justin D. Swindells

(57) ABSTRACT

An agricultural row unit for planting seeds in a furrow includes an opening tool that cuts a furrow in the soil to be planted, and a gauge wheel that engages the soil to control elevation. A depth control actuator applies a controllable down force to the gauge wheel, and a sidewall compaction sensor extends into sidewalls of the furrow and produces a signal representing the compaction of the soil. A controller supplies the depth control actuator with a control signal representing a down pressure set point to form a furrow having a desired depth. The controller uses the signal representing the compaction of the soil in the sidewalls to determine whether the down pressure set point should be increased or decreased, and supplies the depth control actuator with a control signal when it is determined that the down pressure set point should be increased or decreased.

20 Claims, 3 Drawing Sheets

(51) Int. Cl.
  *A01C 5/06* (2006.01)
  *A01C 7/06* (2006.01)

(56) References Cited

U.S. PATENT DOCUMENTS

| | | |
|---|---|---|
| 353,491 A | 11/1886 | Hepworth |
| 523,508 A | 7/1894 | Bower |
| 736,369 A | 8/1903 | Pierce |
| 803,088 A | 10/1905 | Barker |
| 1,069,264 A | 8/1913 | Keller |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 1,938,132 A | 12/1933 | Broemmelsick |
| 2,014,334 A | 9/1935 | Johnson |
| 2,058,539 A | 10/1936 | Welty |
| 2,269,051 A | 1/1942 | Cahoy |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,925,872 A | 2/1960 | Darnell |
| 2,960,358 A | 11/1960 | Christison |
| 3,010,744 A | 11/1961 | Hollis |
| 3,014,547 A | 12/1961 | Van Der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | Mcgee |
| 3,065,879 A | 11/1962 | Jennings |
| 3,080,004 A | 3/1963 | Mcnair |
| 3,103,993 A | 9/1963 | Gies |
| 3,110,973 A | 11/1963 | Reynolds |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,256,942 A | 6/1966 | Van Sickle |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Helmut |
| 3,370,450 A | 2/1968 | Scheucher |
| 3,420,273 A | 1/1969 | Greer |
| 3,447,495 A | 6/1969 | Miller |
| 3,539,020 A | 11/1970 | Torsten |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,718,191 A | 2/1973 | Williams |
| 3,749,035 A | 7/1973 | Cayton |
| 3,753,341 A | 8/1973 | Langlie |
| 3,766,988 A | 10/1973 | Whitesides |
| 3,774,446 A | 11/1973 | Diehl |
| 3,795,291 A | 3/1974 | Naito |
| 3,939,846 A | 2/1976 | Drozhzhin |
| 3,945,532 A | 3/1976 | Marks |
| 3,975,890 A | 8/1976 | Rodger |
| 3,986,464 A | 10/1976 | Uppiano |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | Van Der Lely |
| 4,063,597 A | 12/1977 | Day |
| 4,096,730 A | 6/1978 | Martin |
| 4,099,576 A | 7/1978 | Jilani |
| 4,122,715 A | 10/1978 | Yokoyama |
| 4,129,082 A | 12/1978 | Betulius |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,173,259 A | 11/1979 | Heckenkamp |
| 4,182,099 A | 1/1980 | Davis |
| 4,187,916 A | 2/1980 | Brown |
| 4,191,262 A | 3/1980 | Sylvester |
| 4,194,575 A | 3/1980 | Whalen |
| 4,196,567 A | 4/1980 | Davis |
| 4,196,917 A | 4/1980 | Davis |
| 4,206,817 A | 6/1980 | Bowerman |
| 4,208,974 A | 6/1980 | Dreyer |
| 4,213,408 A | 7/1980 | Atkinson |
| 4,225,191 A | 9/1980 | Knoski |
| 4,233,803 A | 11/1980 | Davis |
| 4,241,674 A | 12/1980 | Mellinger |
| 4,249,613 A | 2/1981 | Scribner |
| 4,280,419 A | 7/1981 | Fischer |
| 4,295,532 A | 10/1981 | Williams |
| 4,301,870 A | 11/1981 | Carre |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | Van Der Lely |
| 4,377,979 A | 3/1983 | Peterson |
| 4,391,335 A | 7/1983 | Birkenbach |
| 4,398,608 A | 8/1983 | Boetto |
| 4,407,371 A | 10/1983 | Hohl |
| 4,430,952 A | 2/1984 | Murray |
| 4,433,568 A | 2/1984 | Kondo |
| 4,438,710 A | 3/1984 | Paladino |
| 4,445,445 A | 5/1984 | Sterrett |
| 4,461,355 A | 7/1984 | Peterson |
| 4,481,830 A | 11/1984 | Smith |
| 4,499,775 A | 2/1985 | Lasoen |
| 4,506,610 A | 3/1985 | Neal |
| 4,508,178 A | 4/1985 | Cowell |
| 4,528,920 A | 7/1985 | Neumeyer |
| 4,530,405 A | 7/1985 | White |
| 4,537,262 A | 8/1985 | Van Der Lely |
| 4,538,688 A | 9/1985 | Szucs |
| 4,550,122 A | 10/1985 | David |
| 4,553,607 A | 11/1985 | Behn |
| 4,580,506 A | 4/1986 | Fleischer |
| 4,596,200 A | 6/1986 | Gafford |
| 4,598,654 A * | 7/1986 | Robertson ............ A01C 7/201 111/165 |

(56) References Cited

U.S. PATENT DOCUMENTS

| | | |
|---|---|---|
| 4,603,746 A | 8/1986 | Swales |
| 4,604,906 A | 8/1986 | Scarpa |
| 4,619,329 A | 10/1986 | Gorbett |
| 4,630,773 A | 12/1986 | Ortlip |
| 4,643,043 A | 2/1987 | Furuta |
| 4,646,620 A | 3/1987 | Buchl |
| 4,646,850 A | 3/1987 | Brown |
| 4,648,466 A | 3/1987 | Baker |
| 4,650,005 A | 3/1987 | Tebben |
| 4,669,550 A | 6/1987 | Sittre |
| 4,671,193 A | 6/1987 | States |
| 4,674,578 A | 6/1987 | Bexten |
| 4,703,809 A | 11/1987 | Van Den Ende |
| 4,726,304 A | 2/1988 | Dreyer |
| 4,738,461 A | 4/1988 | Stephenson |
| 4,744,316 A | 5/1988 | Lienemann |
| 4,762,075 A | 8/1988 | Halford |
| 4,765,190 A | 8/1988 | Strubbe |
| 4,768,387 A | 9/1988 | Kemp |
| 4,776,404 A | 10/1988 | Rogers |
| 4,779,684 A | 10/1988 | Schultz |
| 4,785,890 A | 11/1988 | Martin |
| 4,825,957 A | 5/1989 | White |
| 4,825,959 A | 5/1989 | Wilhelm |
| 4,920,901 A | 5/1990 | Pounds |
| 4,926,767 A | 5/1990 | Thomas |
| 4,930,431 A | 6/1990 | Alexander |
| 4,986,367 A | 1/1991 | Kinzenbaw |
| 4,987,841 A | 1/1991 | Rawson |
| 4,998,488 A | 3/1991 | Hansson |
| 5,015,997 A | 5/1991 | Strubbe |
| 5,027,525 A | 7/1991 | Haukaas |
| 5,033,397 A | 7/1991 | Colburn, Jr. |
| 5,065,632 A | 11/1991 | Reuter |
| 5,074,227 A | 12/1991 | Schwitters |
| 5,076,180 A | 12/1991 | Schneider |
| 5,092,255 A | 3/1992 | Long |
| 5,113,957 A | 5/1992 | Tamai |
| 5,129,282 A | 7/1992 | Bassett |
| 5,136,934 A | 8/1992 | Darby, Jr. |
| 5,190,112 A | 3/1993 | Johnston |
| 5,224,553 A | 7/1993 | Heintzman |
| 5,234,060 A | 8/1993 | Carter |
| 5,240,080 A | 8/1993 | Bassett |
| 5,255,617 A | 10/1993 | Williams |
| 5,269,237 A | 12/1993 | Baker |
| 5,282,389 A | 2/1994 | Faivre |
| 5,285,854 A | 2/1994 | Thacker |
| 5,333,694 A | 8/1994 | Roggenbuck |
| 5,337,832 A | 8/1994 | Bassett |
| 5,341,754 A | 8/1994 | Winterton |
| 5,346,019 A | 9/1994 | Kinzenbaw |
| 5,346,020 A | 9/1994 | Bassett |
| 5,349,911 A | 9/1994 | Holst |
| 5,351,635 A | 10/1994 | Hulicsko |
| 5,379,847 A | 1/1995 | Snyder |
| 5,394,946 A | 3/1995 | Clifton |
| 5,398,771 A | 3/1995 | Hornung |
| 5,419,402 A | 5/1995 | Heintzman |
| 5,427,192 A | 6/1995 | Stephenson |
| 5,443,023 A | 8/1995 | Carroll |
| 5,443,125 A | 8/1995 | Clark |
| 5,461,995 A | 10/1995 | Winterton |
| 5,462,124 A | 10/1995 | Rawson |
| 5,473,999 A | 12/1995 | Rawson |
| 5,474,135 A | 12/1995 | Schlagel |
| 5,477,682 A | 12/1995 | Tobiasz |
| 5,477,792 A | 12/1995 | Bassett |
| 5,479,868 A | 1/1996 | Bassett |
| 5,479,992 A | 1/1996 | Bassett |
| 5,485,796 A | 1/1996 | Bassett |
| 5,485,886 A | 1/1996 | Bassett |
| 5,497,717 A | 3/1996 | Martin |
| 5,497,837 A | 3/1996 | Kehrney |
| 5,499,042 A | 3/1996 | Yanagawa |
| 5,499,683 A | 3/1996 | Bassett |
| 5,499,685 A | 3/1996 | Downing, Jr. |
| 5,517,932 A | 5/1996 | Ott |
| 5,524,525 A | 6/1996 | Nikkel |
| 5,531,171 A | 7/1996 | Whitesel |
| 5,542,362 A | 8/1996 | Bassett |
| 5,544,709 A | 8/1996 | Lowe |
| 5,562,165 A | 10/1996 | Janelle |
| 5,590,611 A | 1/1997 | Smith |
| 5,603,269 A | 2/1997 | Bassett |
| 5,623,997 A | 4/1997 | Rawson |
| 5,640,914 A | 6/1997 | Rawson |
| 5,657,707 A | 8/1997 | Dresher |
| 5,660,126 A | 8/1997 | Freed |
| 5,685,245 A | 11/1997 | Bassett |
| 5,704,430 A | 1/1998 | Smith |
| 5,709,271 A | 1/1998 | Bassett |
| 5,725,057 A | 3/1998 | Taylor |
| 5,727,638 A | 3/1998 | Wodrich |
| 5,809,757 A | 9/1998 | Mclean |
| 5,852,982 A | 12/1998 | Peter |
| 5,868,207 A | 2/1999 | Langbakk |
| 5,878,678 A | 3/1999 | Stephens |
| RE36,243 E | 7/1999 | Roy |
| 5,953,895 A | 9/1999 | Hobbs |
| 5,970,891 A | 10/1999 | Schlagel |
| 5,970,892 A | 10/1999 | Wendling |
| 5,988,293 A | 11/1999 | Brueggen |
| 6,067,918 A | 5/2000 | Kirby |
| 6,068,061 A | 5/2000 | Smith |
| 6,085,501 A | 7/2000 | Walch |
| 6,091,997 A | 7/2000 | Flamme |
| 6,164,385 A | 12/2000 | Buchl |
| 6,176,334 B1 | 1/2001 | Lorenzen |
| 6,223,663 B1 | 5/2001 | Wendling |
| 6,223,828 B1 | 5/2001 | Paulson |
| 6,237,696 B1 | 5/2001 | Mayerle |
| 6,253,692 B1 | 7/2001 | Wendling |
| 6,314,897 B1 | 11/2001 | Hagny |
| 6,325,156 B1 | 12/2001 | Barry |
| 6,330,922 B1 | 12/2001 | King |
| 6,331,142 B1 | 12/2001 | Bischoff |
| 6,343,661 B1 | 2/2002 | Thompson |
| 6,347,594 B1 | 2/2002 | Wendling |
| 6,382,326 B1 | 5/2002 | Goins |
| 6,389,999 B1 | 5/2002 | Duello |
| 6,453,832 B1 | 9/2002 | Schaffert |
| 6,454,019 B1 | 9/2002 | Prairie |
| 6,460,623 B1 | 10/2002 | Knussman |
| 6,516,595 B2 | 2/2003 | Rhody |
| 6,530,334 B2 | 3/2003 | Hagny |
| 6,575,104 B2 | 6/2003 | Brummelhuis |
| 6,644,224 B1 | 11/2003 | Bassett |
| 6,681,868 B2 | 1/2004 | Kovach |
| 6,701,856 B1 | 3/2004 | Zoske |
| 6,701,857 B1 | 3/2004 | Jensen |
| 6,715,433 B1 | 4/2004 | Friestad |
| 6,786,130 B2 | 9/2004 | Steinlage |
| 6,834,598 B2 | 12/2004 | Detlef |
| 6,840,853 B2 | 1/2005 | Foth |
| 6,853,937 B2 | 2/2005 | Shibusawa |
| 6,886,650 B2 | 5/2005 | Bremner |
| 6,912,963 B2 | 7/2005 | Bassett |
| 6,968,907 B1 | 11/2005 | Raper |
| 6,986,313 B2 | 1/2006 | Halford |
| 6,997,400 B1 | 2/2006 | Hanna |
| 7,004,090 B2 | 2/2006 | Swanson |
| 7,044,070 B2 | 5/2006 | Kaster |
| 7,063,167 B1 | 6/2006 | Staszak |
| 7,159,523 B2 | 1/2007 | Bourgault |
| 7,163,227 B1 | 1/2007 | Burns |
| 7,222,575 B2 | 5/2007 | Bassett |
| 7,290,491 B2 | 11/2007 | Summach |
| 7,325,756 B1 | 2/2008 | Giorgis |
| 7,360,494 B2 | 4/2008 | Martin |
| 7,360,495 B1 | 4/2008 | Martin |
| 7,438,006 B2 | 10/2008 | Mariman |
| 7,451,712 B2 | 11/2008 | Bassett |
| 7,523,709 B1 | 4/2009 | Kiest |

(56) References Cited

U.S. PATENT DOCUMENTS

| | | |
|---|---|---|
| 7,540,333 B2 | 6/2009 | Bettin |
| 7,575,066 B2 | 8/2009 | Bauer |
| 7,584,707 B2 | 9/2009 | Sauder |
| 7,665,539 B2 | 2/2010 | Bassett |
| 7,673,570 B1 | 3/2010 | Bassett |
| 7,743,718 B2 | 6/2010 | Bassett |
| 7,870,827 B2 | 1/2011 | Bassett |
| 7,918,285 B1 | 4/2011 | Graham |
| 7,938,074 B2 | 5/2011 | Liu |
| 7,944,210 B2 | 5/2011 | Fischer |
| 7,946,231 B2 | 5/2011 | Martin |
| 8,146,519 B2 | 4/2012 | Bassett |
| 8,151,717 B2 | 4/2012 | Bassett |
| 8,171,707 B2 | 5/2012 | Kitchel |
| D663,326 S | 7/2012 | Allensworth |
| 8,327,780 B2 | 12/2012 | Bassett |
| 8,359,988 B2 | 1/2013 | Bassett |
| 8,380,356 B1 | 2/2013 | Zielke |
| 8,386,137 B2 | 2/2013 | Sauder |
| 8,393,407 B2 | 3/2013 | Freed |
| 8,408,149 B2 | 4/2013 | Rylander |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |
| 8,649,930 B2 | 2/2014 | Reeve |
| 8,746,661 B2 | 6/2014 | Runkel |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,863,857 B2 | 10/2014 | Bassett |
| 8,910,581 B2 | 12/2014 | Bassett |
| 8,939,095 B2 | 1/2015 | Freed |
| 8,985,232 B2 | 3/2015 | Bassett |
| 9,003,982 B1 | 4/2015 | Elizalde |
| 9,003,983 B2 | 4/2015 | Roth |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,144,187 B2 | 9/2015 | Bassett |
| 9,148,989 B2 | 10/2015 | Van Buskirk |
| 9,167,740 B2 | 10/2015 | Bassett |
| 9,192,088 B2 | 11/2015 | Bruce |
| 9,192,089 B2 | 11/2015 | Bassett |
| 9,192,091 B2 | 11/2015 | Bassett |
| 9,215,838 B2 | 12/2015 | Bassett |
| 9,215,839 B2 | 12/2015 | Bassett |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin |
| 9,307,690 B2 | 4/2016 | Bassett |
| 9,504,195 B2 | 11/2016 | Daniel |
| 9,615,497 B2 | 4/2017 | Bassett |
| 9,668,398 B2 | 6/2017 | Bassett |
| 9,681,601 B2 | 6/2017 | Bassett |
| 9,723,778 B2 | 8/2017 | Bassett |
| 10,548,260 B2 * | 2/2020 | Bassett ............... A01B 79/005 |
| 2002/0162492 A1 | 11/2002 | Juptner |
| 2003/0141086 A1 | 7/2003 | Kovach |
| 2004/0005929 A1 | 1/2004 | Piasecki |
| 2005/0005704 A1 | 1/2005 | Adamchuk |
| 2006/0102058 A1 | 5/2006 | Swanson |
| 2006/0191695 A1 | 8/2006 | Walker |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |
| 2008/0236461 A1 | 10/2008 | Sauder |
| 2008/0256916 A1 | 10/2008 | Vaske |
| 2009/0260902 A1 | 10/2009 | Holman |
| 2010/0019471 A1 | 1/2010 | Ruckle |
| 2010/0108336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0147148 A1 | 6/2011 | Ripa |
| 2011/0247537 A1 | 10/2011 | Freed |
| 2011/0313575 A1 | 12/2011 | Kowalchuk |
| 2012/0167809 A1 | 7/2012 | Bassett |
| 2012/0186216 A1 | 7/2012 | Vaske |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0248212 A1 | 9/2013 | Bassett |
| 2013/0325267 A1 | 12/2013 | Adams |
| 2013/0333599 A1 | 12/2013 | Bassett |
| 2014/0000448 A1 | 1/2014 | Franklin, III |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0116735 A1 * | 5/2014 | Bassett ............... A01C 7/203 |
| | | 172/430 |
| 2014/0165527 A1 | 6/2014 | Oehler |
| 2014/0190712 A1 | 7/2014 | Bassett |
| 2014/0197249 A1 | 7/2014 | Roth |
| 2014/0214284 A1 | 7/2014 | Sauder |
| 2014/0224513 A1 | 8/2014 | Van Buskirk |
| 2014/0224843 A1 | 8/2014 | Rollenhagen |
| 2014/0278696 A1 | 9/2014 | Anderson |
| 2015/0216108 A1 | 8/2015 | Roth |
| 2015/0373901 A1 | 12/2015 | Bassett |
| 2016/0066498 A1 | 3/2016 | Bassett |
| 2016/0128263 A1 | 5/2016 | Bassett |
| 2016/0270285 A1 | 9/2016 | Hennes |
| 2016/0309641 A1 | 10/2016 | Taunton |
| 2017/0034985 A1 | 2/2017 | Martin |
| 2017/0049044 A1 * | 2/2017 | Stoller ............... A01C 23/025 |
| 2017/0094889 A1 * | 4/2017 | Garner ............... A01C 7/206 |
| 2017/0164548 A1 | 6/2017 | Bassett |
| 2017/0181373 A1 | 6/2017 | Bassett |
| 2017/0238458 A1 * | 8/2017 | Achen ............... A01C 5/064 |
| 2018/0125000 A1 * | 5/2018 | Levy ............... A01C 21/002 |

FOREIGN PATENT DOCUMENTS

| | | |
|---|---|---|
| DE | 335464 | 9/1921 |
| DE | 1108971 | 6/1961 |
| DE | 2402411 | 7/1975 |
| EP | 1143784 | 10/2001 |
| EP | 2497348 A1 | 9/2012 |
| EP | 3150045 | 4/2017 |
| GB | 1574412 | 9/1980 |
| GB | 2056238 A | 3/1981 |
| GB | 2160401 | 12/1985 |
| JP | S5457726 | 5/1979 |
| SU | 392897 | 8/1973 |
| SU | 436778 | 7/1974 |
| SU | 611201 | 6/1978 |
| SU | 625648 | 9/1978 |
| SU | 1410884 A | 7/1988 |
| SU | 1466674 | 3/1989 |
| WO | 2009145381 A1 | 12/2009 |
| WO | 2011161140 A1 | 12/2011 |
| WO | 2012149367 A1 | 11/2012 |
| WO | 2012149415 A1 | 11/2012 |
| WO | 2012167244 A1 | 12/2012 |
| WO | 2013025898 A1 | 2/2013 |
| WO | 2016073964 | 5/2016 |
| WO | 2016073966 | 5/2016 |
| WO | 2016205424 A1 | 12/2016 |

(56) References Cited

OTHER PUBLICATIONS

Borgelt, Steven C., "Sensor Technologies and Control Strategies for Managing Variability," University of Missouri, Apr. 14-16, 1992 (15 pages).
Buffalo Farm Equipment All Flex Cultivator Operator Manual, Apr. 1990 (7 pages).
Buffalo Farm Equipment Catalog on Models 4600, 4630, 4640, and 4620date estimated as early as Feb. 1992 (4 pages).
Case Corporation Brochure, Planters 900 Series Units/Modules Product InformationAug. 1986 (4 pages).
Exner, Rick, "Sustainable Agriculture: Practical Farmers of Iowa Reducing Weed Pressure in Ridge-Till," Iowa State University University Extension, http://www.extension.iastate.edu/Publications/SA2.pdf, Jul. 1992, Reviewed Jul. 2009, Retrieved Nov. 2, 2012 (4 pages).
Extended European Search Report for European Application No. 18170813.2, dated Jul. 23, 2018 (8 pages).
Finck, Charlene, "Listen to Your Soil," Farm Journal Article, Jan. 1993pp. 14-15 (2 pages).
Hiniker 5000 Cultivator Brochure, date estimated as early as Feb. 1992 (4 pages).
Hiniker Company, Flow & Acreage Continuous Tracking System Monitor Demonstration Manuel, date estimated as early as Feb. 1991 (7 pages).
Hiniker Series 5000 Row Cultivator Rigid and Folding Toolbar Operator's Manual, date estimated as early as Feb. 1992 (5 pages).
John Deere, New 4435 Hydro Row-Crop and Small-Grain Combinedate estimated as early as Feb. 1993 (8 pages).
John Deere, New Semi-Active Sea Suspension, http://www.deere.com/en-US/parts/agparts/semiactiveseat.html, date estimated as early as Jan. 2014, retrieved Feb. 6, 2014 (2 pages).
John Deere, Seat Catalog, date estimated as early Sep. 2011 (19 pages).
Martin Industries, LLC Paired 13" Spading Closing Wheels Brochure, date estimated as early as Jun. 6, 2012pp. 18-25 (8 pages).
Orthman Manufacturing, Inc., Rowcrop Cultivator Bookletdate estimated as early as Feb. 1992 (4 pages).
Russnogle, John, "Sky Spy: Gulf War Technology Pinpoints Field and Yields," Top Producer, A Farm Journal Publication, Nov. 1991pp. 12-14 (4 pages).
Shivvers, Moisture Trac 3000 Brochure, Aug. 21, 1990 (5 pages).
The New Farm, "New Efficiencies in Nitrogen Application," Feb. 1991, p. 6 (1 page).
Vansichen, R et al."Continuous Wheat Yield Measurement on a Combine," date estimated as early as Feb. 1993 (5 pages).
Vogt, Willie, "Revisiting Robotics," http://m.farmindustrynews.com/farm-equipment/revisiting-robotics, Dec. 19, 2013 (3 pages).
Yetter 2010 Product Catalogdate estimated as early as Jan. 2010 (2 pages).
Yetter Catalog, date estimated as early as Feb. 1992 (4 pages).
Yetter Cut and Move Manual, Sep. 2010 (28 pages).

\* cited by examiner

US 12,290,020 B2

SYSTEM FOR AUTOMATICALLY SETTING THE SET POINT OF A PLANTER AUTOMATIC DOWN PRESSURE CONTROL SYSTEM WITH A SEED FURROW SIDEWALL COMPACTION MEASUREMENT DEVICE

FIELD OF THE INVENTION

The present invention relates to a system for assisting the operator of planter row units having automatic down pressure control systems to adjust the settings of such systems.

BACKGROUND

Down pressure control systems can control the pressure based on feedback from a sensor measuring the pressure on the planter gauge wheels. For example, a farmer might set the system to keep 200 lbs of force on the gauge wheels. Then a controller increases or decreases the force from the row unit down pressure actuator so as to try to maintain the force at that set point.

Farmers frequently are confused about what the correct set point is for down pressure control. Is lighter better? There are arguments for this because an excessively compacted furrow can make it harder for the roots to grow and even result in the dreaded "Mohawk roots" where the roots grow along the length of the furrow instead of out and down. Too little sidewall compaction can also be a problem because insufficient firming of the soil in some soil conditions can result in an inconsistent vee shape to the furrow resulting in inconsistent seed placement because the vee is intended to collect the seed at the bottom of the vee. Insufficient firming can result in a furrow that falls in on itself.

SUMMARY

In accordance with one embodiment, an agricultural row unit for planting seeds in a furrow, comprising a frame having a gauge wheel that engages the soil to control the elevation of the frame and an opening tool that cuts a furrow in the soil to be planted. A gauge wheel down force control system includes an actuator that applies a controllable down force to the gauge wheel to control the depth of the furrow. A sidewall compaction sensor extends into the furrow and into the sidewalls of the furrow and produces a signal representing the compaction of the soil in the sidewalls. A controller supplies the depth control actuator with a control signal representing a down pressure set point to form a furrow having a desired depth. The controller receives the signal representing the compaction of the soil in the sidewalls and uses the signal in an algorithm to determine whether the down pressure set point should be increased or decreased, and supplies the depth control actuator with a control signal when it is determined that the down pressure set point should be increased or decreased.

The invention also provides a method for controlling the down pressure on an agricultural row unit for planting seeds in a furrow and including a down pressure control actuator. The method supplies the down pressure control actuator with a control signal representing a down pressure set point; senses the compaction of the soil forming the sidewalls of the furrow and produces a signal representing the sensed compaction, (c) uses the signal representing the sensed compaction in an algorithm to determine whether the down pressure set point should be increased or decreased, and (d) adjusts the control signal representing a down pressure set point when it is determined that the down pressure set point should be increased or decreased.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications and equivalent arrangements as may be included within the spirit and scope of invention as defined by the appended claims.

Figure 1:
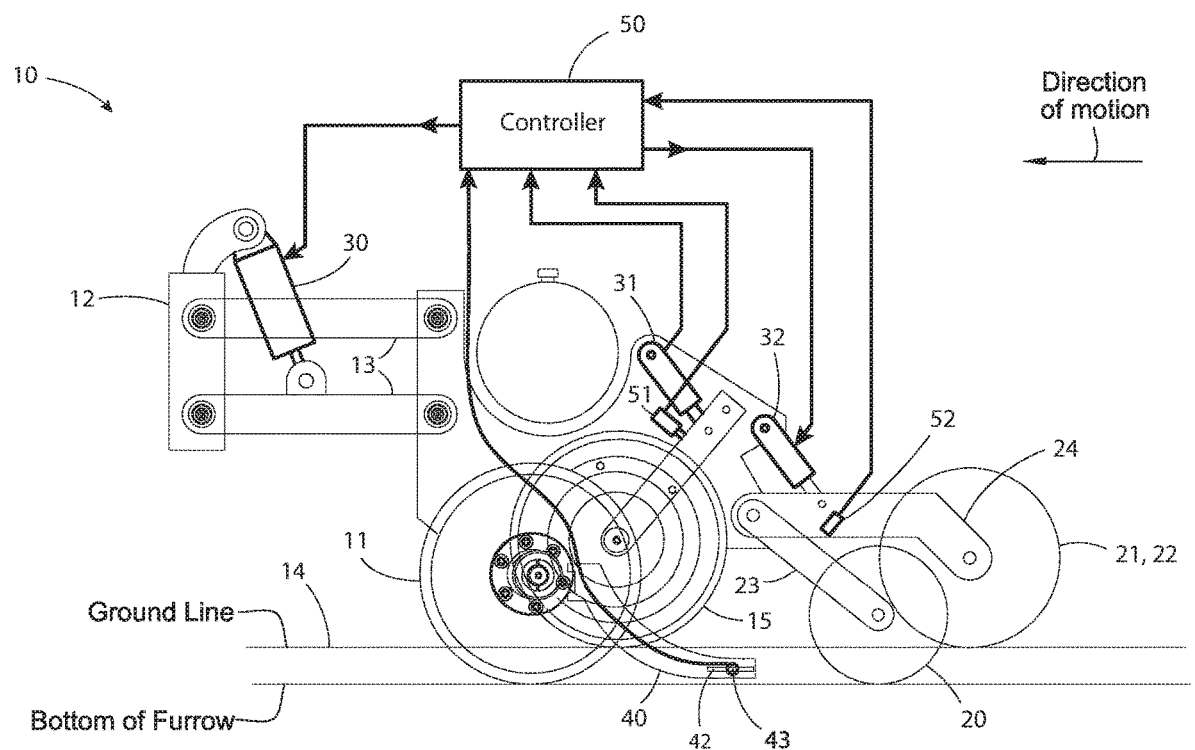
FIG. 1 is a side elevation, partially schematic, of a planter row unit that includes multiple control systems.

In the embodiment illustrated in FIG. 1, a planting row unit 10 includes a furrow-opening device 11 for the purpose of planting seed or injecting fertilizer into the soil. A conventional elongated hollow towing frame 12 (typically hitched to a tractor by a draw bar) is rigidly attached to the front frame of a conventional four-bar linkage assembly 13 that is part of the row unit 10. The four-bar (sometimes referred to as "parallel-bar") linkage assembly 13 is a conventional and well known linkage used in agricultural implements to permit the raising and lowering of tools attached thereto.

As the planting row unit 10 is advanced by a tractor, the opening device 11 penetrates the soil to form a furrow or seed slot 14 having a depth D. A gauge wheel 15 determines the planting depth for the seed and the height of introduction of fertilizer, etc. The planting row unit 10 is urged downwardly against the soil by its own weight and, in addition, a hydraulic cylinder 30 is coupled between the front frame 12 and the linkage assembly 13 to urge the row unit 10 downwardly with a controllable force that can be adjusted for different soil conditions. The hydraulic cylinder 30 may also be used to lift the row unit off the ground for transport by a heavier, stronger, fixed-height frame that is also used to transport large quantities of fertilizer for application via multiple row units.

A system for controlling the down pressure applied to the row unit by the hydraulic cylinder 14 is described in U.S. Pat. No. 9,226,440, issued Jan. 5, 2016.

Bins on the row unit carry the chemicals and seed which are directed into the soil. Other portions of the row unit 10 then deposit seed in the seed slot and fertilizer adjacent to the seed slot, and the seeds are pressed into the bottom of the furrow by a firming wheel 20. The furrow is closed by a pair of closing wheels 21 and 22 that are pressed into opposite side walls of the furrow 14 to distribute loosened soil into the furrow, over the seeds in the bottom of the furrow. The firming wheel is carried on the end of an arm 23, and the closing wheels 21, 22 are carried on the end of an arm 24. The arms 23 and 24 are mounted for pivoting movement about a common axis 25, and a hydraulic cylinder 32 presses the closing wheels downwardly with a controlled pressure.

In accordance with one embodiment of the present invention, a narrow bar 40 trails the opening device 10 in the furrow 14 to monitor the hardness or compaction of the soil that forms the side walls of the furrow. The monitoring device 40 has two hard metal wings 41 and 42 that protrude laterally from the sides of the bar 40. The distance between the tips of the wings 41 and 42 is slightly longer than the width of the furrow opened by the opening device 11. The force exerted on the wings 41 and 42 by the soil in the furrow sidewalls is transmitted to a load cell 43 (or other force-measuring device), producing an electrical signal that is proportional to the strain on the wings. That strain varies with the hardness or level of compaction of the soil in the furrow sidewalls.

Figure 2:
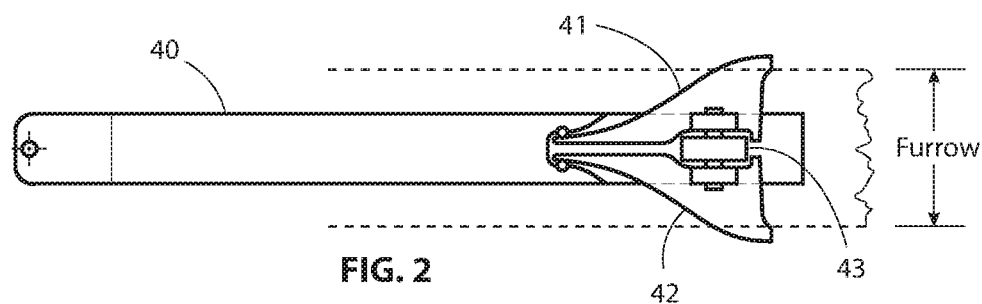
FIG. 2 is an enlarged plan view of the sidewall compaction measuring device in the row unit of FIG. 1.
Figure 3:
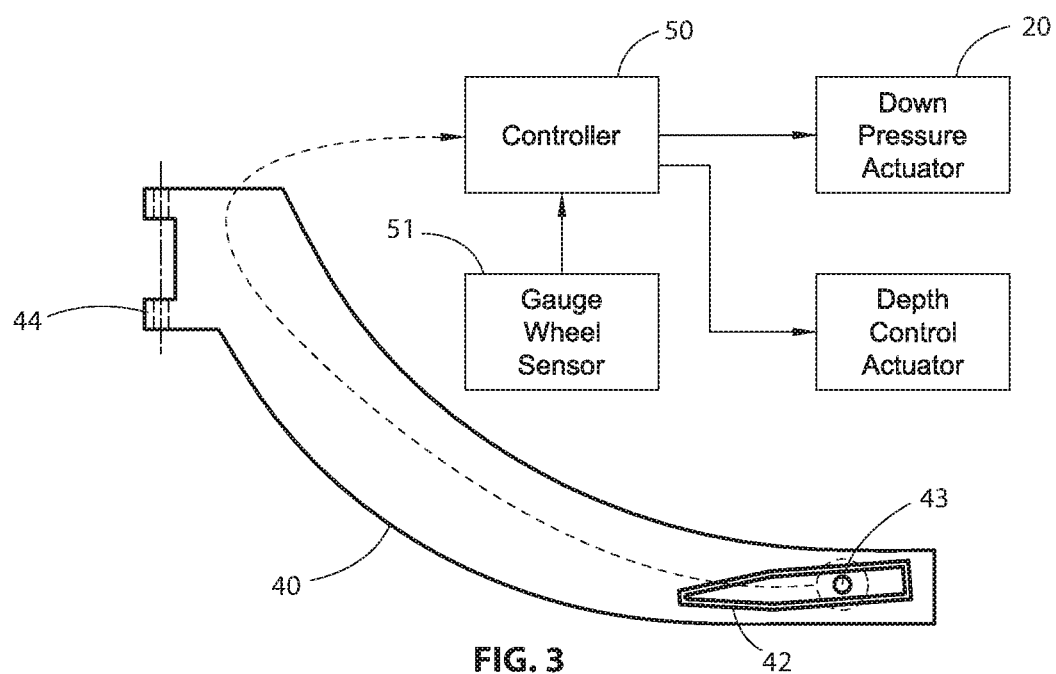
FIG. 3 is a side elevation of the sidewall compaction measuring device shown in FIG. 2.

In the embodiment illustrated in FIGS. 2 and 3, the bar 40 has a yoke 44 at the upper end for attachment to the frame of the row unit. The bar 40 curves downwardly into the furrow 14 so that the trailing end of the bar slides on the bottom of the furrow, as depicted in FIG. 1. The wings 41 and 42 are mounted on the bar 40 near its trailing end, on opposite sides of a load cell 43. The distance between the outer ends of the wings 41 and 42 is smaller than the width of the furrow 14, so that the tips of the wings penetrate into the sidewalls of the furrow. The resulting forces applied to the wing tips urge the wings toward each other, thereby applying opposed forces to opposite ends of the load cell 43 located between the two wings 41 and 42. This causes the load cell 43 to produce an electrical output signal having a magnitude proportional to the forces applied to the wings, which in turn is proportional to the hardness or compaction of the soil in the side walls of the furrow.

The signal from the load cell 43 is supplied to a controller 50 that also receives input signals from sensors 51 and 52 on the support arms 53 and 24 that carry the gauge wheel 15 and the closing wheels 21, 22. The controller 50 uses these three input signals to produce three output signals that control three hydraulic cylinders 20, 31 and 32 that apply down forces to (a) the four-bar linkage for the entire row unit, (b) the arm that carries the gauge wheel 15, and (c) the closing wheels 21, 22, respectively.

Figure 4:
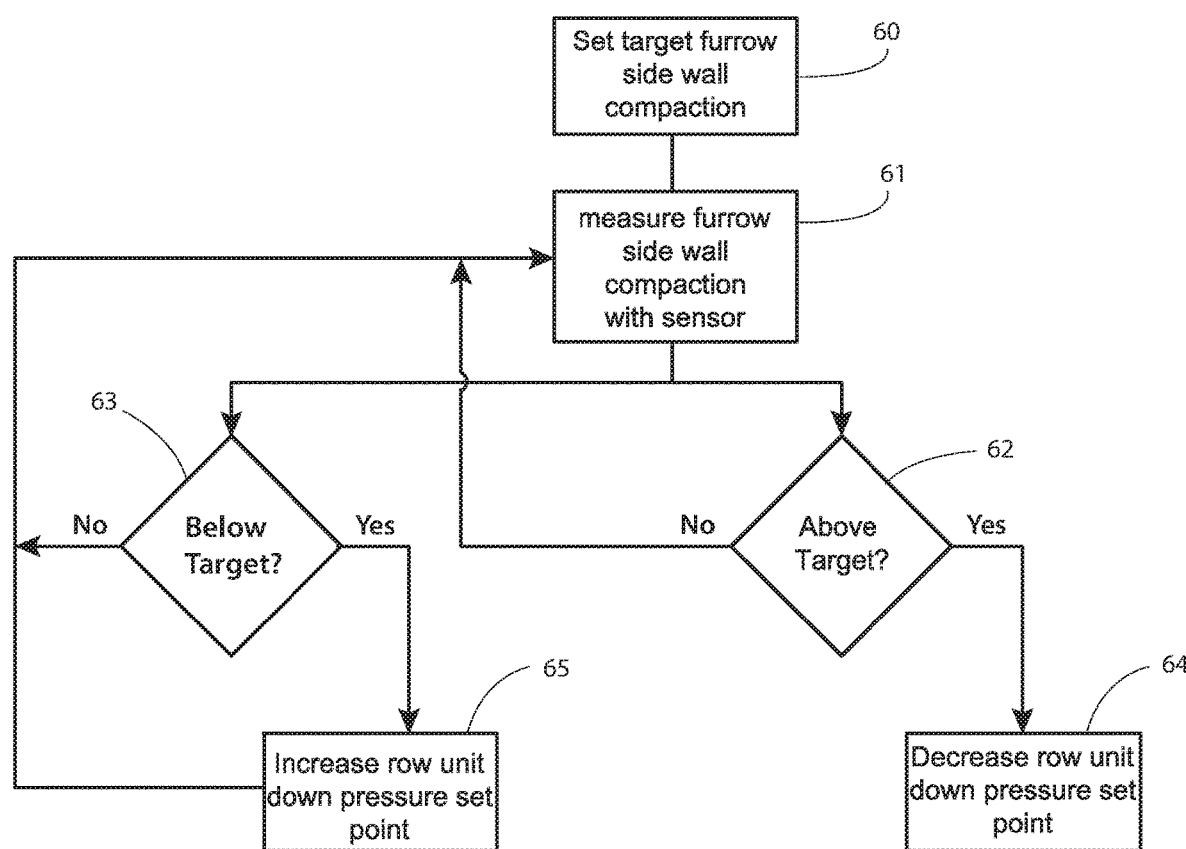
FIG. 4 is a flow chart of an algorithm executed by the controller shown in FIGS. 1 and 3, using the output signal from the sidewall compaction measuring device.

The algorithm used by the controller 20 to control the down force applied to the gauge wheel 15 compares the signal received from the load cell 43 with a target value for the sidewall compaction. One example of such an algorithm is depicted by the flow chart in FIG. 4. The first step 60 sets a target value for furrow side wall compaction. Then the actual furrow side wall compaction is measured and compared with the target value at step 61. Step 62 determines whether the measured value is more than a predetermined value above the target value, and if the answer is affirmative, the row unit down pressure set point is decreased at step 64 by sending a signal to the controller 50. Step 63 determines whether the measured value is more than a predetermined value below the target value, and if the answer is affirmative, the row unit down pressure set point is increased at step 65 by sending a signal to the controller 50. A negative answer at either step 62 or 63 returns the system to step 61.

To increase or decrease the row unit down pressure set point, the controller 50 produces an output signal that adjusts the set point of the row unit gauge wheel down force control system. For example, if the set point of down force control system is set at 200 lbs and the algorithm produces a signal to increase that set point, the down force control system increase the set point to 225 lbs. This added force on the gauge wheel increases the compression of the soil under the gauge wheel, adjacent the vee opener. If the signal from the force-measuring device is still too low, the controller 50 will receive a signal from the algorithm to increase the set point again. This process is repeated until the signal from the sidewall compaction-measuring device falls within a dead band around the set point of the row unit gauge wheel down force control system. If the signal from the compaction-measuring device is too high, the controller 50 produces an output signal that decreases the set point rather than increasing it. The control system thus prevents over-compaction of the furrow, thereby allowing optimal root growth. It also solves the operator's problem of how to set an automatic down pressure control system.

The winged device can serve multiple purposes at the same time. For example, it can act as a seed firmer by locating the bar 40 downstream of where seed is deposited in the furrow. In another example, the wings 41 and 42 can be provided with passageways that permit liquid or gas fertilizer to pass through the blades and into the grooves cut in the side of the furrow by the wings 41 and 42.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

The invention claimed is:

1. An agricultural row unit for planting seeds in a furrow, comprising:
   a row unit frame having (a) a gauge wheel configured to engage the soil to control the elevation of the row unit frame and (b) an opening tool configured to cut a furrow in the soil to be planted;
   a gauge wheel down force control system that includes an actuator configured to apply a controllable down pressure to said gauge wheel to control the depth of said furrow;
   a compaction sensor configured to extend into the furrow and toward at least one of a first sidewall or a second sidewall of the furrow and to produce a signal representing the compaction of the soil in the at least one of said first sidewall of the furrow or in said second sidewall of the furrow; and
   a controller configured to supply said actuator with a control signal representing a down pressure set point to form a furrow having a desired depth, said controller further configured to receive said signal representing the compaction of the soil in the at least one of said first sidewall of the furrow or said second sidewall of the furrow and to use said signal to determine whether said down pressure set point should be increased or decreased, and to supply said actuator with a control signal when it is determined that said down pressure set point should be increased or decreased.

2. The agricultural row unit of claim 1 in which said compaction sensor includes lateral projections configured to extend into each of said first sidewall of the furrow and said second sidewall of the furrow, and a load cell coupled to said projections and configured to produce an electrical signal that changes with the compaction of the soil in the furrow sidewalls.

3. The system of claim 2 in which said projections comprise wings that extend laterally from opposite sides of a bar configured to be dragged along the furrow, the tips of said wings configured to extend into the furrow side walls.

4. The agricultural row unit of claim 2 which includes a controller configured to receive said electrical signal and configured to adjust said control signal based at least in part on said electrical signal from said load cell.

5. A method of controlling the down pressure on an agricultural row unit for planting seeds in a furrow and including a gauge wheel down force control system that includes an actuator applying a controllable down pressure to the gauge wheel to control the depth of the furrow, said method comprising
supplying said actuator with a control signal representing a down pressure set point;
sensing, using a compaction sensor, the compaction of the soil forming a first sidewall of the furrow and a second sidewall of the furrow and producing a signal representing the sensed compaction of both the soil in said first sidewall of the furrow and said second sidewall of the furrow;
using said signal representing the sensed compaction to determine whether said down pressure set point should be increased or decreased; and
adjusting said control signal representing a down pressure set point when it is determined that said down pressure set point should be increased or decreased.

6. The method of claim 5 in which said compaction sensor includes lateral projections configured to extend into each of said first sidewall of the furrow and said second sidewall of the furrow, and a load cell coupled to said projections and configured to produce an electrical signal that changes with the compaction of the soil in the furrow sidewalls.

7. The method of claim 6 in which said projections comprise wings that extend laterally from opposite sides of a bar configured to be dragged along the furrow, the tips of said wings configured to extend into the furrow side walls.

8. The method of claim 6 in which a controller receives said electrical signal and produces said control signal based at least in part on said electrical signal from said load cell.

9. The agricultural row unit of claim 1 in which the controller is further configured to determine whether said signal falls within a dead band around the down pressure set point.

10. The agricultural row unit of claim 1 in which the controller is further configured to adjust the down pressure set point automatically based on said signal.

11. The agricultural row unit of claim 10 in which the adjusting the down pressure set point is based on whether said signal falls within the dead band.

12. The agricultural row unit of claim 1 further comprising a support arm that carries a closing wheel and a sensor on the support arm providing an output signal to the controller to cause a down force to be applied to the closing wheel or to the row unit.

13. The agricultural row unit of claim 1, wherein the compaction sensor is positioned between a ground line and a bottom of the furrow downstream of the gauge wheel, and wherein said signal from the compaction sensor is provided on a dedicated line to the controller.

14. The agricultural row unit of claim 1, wherein said signal from the compaction sensor is indicative of a force or strain detected by the compaction sensor.

15. The agricultural row unit of claim 1, wherein the compaction sensor is coupled to a bar located downstream of where a seed is deposited by the row unit in the furrow, a portion of the bar operating as a seed firmer responsive to the seed being deposited in the furrow.

16. The agricultural row unit of claim 12, further comprising a second sensor on a support arm that carries the gauge wheel, the controller using the signal from the compaction sensor, the output signal, and a second output signal from the second sensor to apply a downforce to the entire row unit, to an arm that carries the gauge wheel, and to the closing wheel.

17. The agricultural row unit of claim 1, in combination with a tractor to which the agricultural row unit is coupled.

18. The agricultural row unit of claim 1 in which the controller is further configured to determine whether said signal falls within a dead band around the down pressure set point and to adjust the down pressure set point automatically based on said signal, the adjusting being carried out based on whether said signal falls within the dead band, the row unit further comprising a support arm that carries a closing wheel and a sensor on the support arm providing an output signal to the controller to cause a down force to be applied to the closing wheel or to the row unit.

19. The agricultural row unit of claim 18, further comprising a second sensor on a support arm that carries the gauge wheel, the controller using the signal from the compaction sensor, the output signal, and a second output signal from the second sensor to apply a downforce to the entire row unit, to an arm that carries the gauge wheel, and to the closing wheel.

20. The agricultural row unit of claim 1, wherein the controller compares said signal with a target value for sidewall compaction to determine whether the down pressure set point should be increased or decreased.

\* \* \* \* \*